(12) United States Patent
Chougule (10) Patent No.: US 9,945,421 B2
(45) Date of Patent: Apr. 17, 2018

(54) BEARING RETAINER, BEARING AND ASSOCIATED METHOD

(71) Applicant: Regal Beloit America, Inc., Beloit, WI (US)

(72) Inventor: Shivakumar Raosaheb Chougule, Pune (IN)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/202,609

(22) Filed: Jul. 6, 2016

(65) Prior Publication Data
US 2018/0010641 A1 Jan. 11, 2018

(51) Int. Cl.
| F16C 19/06 | (2006.01) |
| F16C 19/16 | (2006.01) |
| F16C 33/38 | (2006.01) |
| F16C 33/66 | (2006.01) |
| F16C 33/46 | (2006.01) |

(52) U.S. Cl.
CPC .......... *F16C 33/6614* (2013.01); *F16C 19/06* (2013.01); *F16C 19/16* (2013.01); *F16C 33/3862* (2013.01); *F16C 33/3875* (2013.01); *F16C 33/3887* (2013.01); *F16C 33/4652* (2013.01)

(58) Field of Classification Search
CPC .. F16C 19/06; F16C 33/3862; F16C 33/3875; F16C 33/3887; F16C 33/4641; F16C 33/4652; F16C 33/6614; F16C 33/6622; F16C 19/16

USPC ....... 384/462, 470, 473–474, 490, 523, 529, 384/530, 539; 29/898.065, 898.067, 29/898.1
See application file for complete search history.

(56) References Cited

U.S. PATENT DOCUMENTS

| 2,742,332 | A | * | 4/1956 | Cobb | F16C 33/3862 |
| | | | | | 184/107 |
| 3,471,208 | A | * | 10/1969 | Vannest | F16C 33/3868 |
| | | | | | 384/530 |
| 3,743,369 | A | * | 7/1973 | Langstrom | F16C 33/3856 |
| | | | | | 384/470 |
| 4,324,444 | A | | 4/1982 | Buczynski et al. | |
| 4,541,739 | A | | 9/1985 | Allen et al. | |
| 4,744,679 | A | | 5/1988 | Verburg et al. | |
| 5,230,570 | A | | 7/1993 | Bursey, Jr. et al. | |

(Continued)

FOREIGN PATENT DOCUMENTS

| DE | 102011077935 A1 | * | 12/2012 | .......... F16C 33/3862 |
| JP | H0687722 U | * | 12/1994 | .......... F16C 33/3862 |
| SU | 557215 A1 | * | 5/1977 | ............ F16C 37/007 |

*Primary Examiner* — Marcus Charles
(74) *Attorney, Agent, or Firm* — John Wagley (57) ABSTRACT

A bearing retainer for use in a bearing is provided. The bearing includes an inner ring, rolling elements and an outer ring. The bearing retainer includes a body. The body defines an inner periphery and an outer periphery of the body. The body further defines a plurality of inner walls. Each inner wall defines an opening extending from the inner periphery to the outer periphery of the body. The plurality of openings are adapted to receive one of the rolling elements. The inner walls are adapted to keep the rolling elements in a spaced apart relationship. At least one of the inner walls defines an aperture through the body. The aperture is adapted for storing lubrication therein.

13 Claims, 9 Drawing Sheets

(56) References Cited

U.S. PATENT DOCUMENTS

| | | |
|---|---|---|
| 6,764,307 B2 | 7/2004 | Metrikin |
| 7,507,028 B2 * | 3/2009 | Markle .............. F16C 33/3875 384/470 |
| 8,360,653 B2 | 1/2013 | Shaikh |
| 8,408,808 B2 * | 4/2013 | Hosmer ............. F16C 33/3875 384/470 |
| 8,888,375 B2 | 11/2014 | Brock |
| 9,057,405 B2 | 6/2015 | Hofmann et al. |
| 2002/0126927 A1 * | 9/2002 | Compassi ............. F16C 33/416 384/470 |
| 2013/0272638 A1 * | 10/2013 | Mola .................. F16C 33/3875 384/470 |
| 2015/0049977 A1 | 2/2015 | He |
| 2015/0377289 A1 | 12/2015 | Scheidel et al. |

* cited by examiner

BEARING RETAINER, BEARING AND ASSOCIATED METHOD

BACKGROUND OF THE INVENTION

The embodiments described herein relate generally to bearings, and more specifically, to a retainer for a rolling element bearing.

Bearing assemblies are utilized to permit the relative motion of one component or assembly with respect to another component or assembly. The bearing assembly typically has a first component, for example an inner ring, that is fixed to a first component and a second component, for example an outer ring that is fixed to a second component. The second component is permitted to have relative motion, typically to rotate, relative to the first component.

Many bearing assembly application provide for the rotation of the inner element which is secured to a shaft while the outer element is secured to a housing. Typically the inner element rotates, but many applications provide for the outer element rotating and the inner element stationary.

Often the bearing assembly is mounted in a housing and the inner element which is secured to a shaft. The housing may be in the form of a housing with a mounting arrangement for mounting to a surface with fasteners.

The rotation of the second component may be permitted by providing mating cylindrical surfaces between the components, where are typically known as sleeve bearings, as one of the two components is typically sleeved with a material that provides low friction rotation between the moving components.

Alternatively a widely used configuration to permit rotation between the components is in the form of a set of rolling elements that are positioned between the cylindrical surface of one component and the cylindrical surface of the second component. The rolling element may be balls, needles, cylinders or cylinders with spherical outer peripheries, also known as spherical rollers. A single row of rolling elements may be used or two or more rows may be used in a spaced apart configuration. The rolling elements may be placed in adjoining relationship on the outer periphery of the inner element and on the inner periphery of the outer element. Alternatively the rolling elements may be positioned in a spaced apart relationship, separated from each other by a separator in the form of a retainer or cage. The rolling elements and the inner element, ring or race and the outer element, ring or race form a rolling element bearing.

Separators serve to separate adjacent rolling elements and to generally direct the rolling elements as they roll in the bearing races of the bearing inner ring and the bearing outer ring. Typically the separators are supported by the rolling elements and float between the inner ring and the outer ring of the bearing.

Lubricants are use to provide lubrication of the bearing race surfaces and the rolling element surfaces. The lubrication of these surfaces greatly reduces friction and extends the life of the bearing. The lubrication typically is from natural or synthetic oil. The oil may be suspended in grease. The grease may move away from the path of the rolling elements during bearing use. This grease and the lubricating oil that is suspending in the grease are available for replenishment as the oil is consumed by the bearing.

The grease that tends to move away from the path of the rolling elements during use tends to move out to the sides and outer periphery of the bearing during operation due to centrifugal forces. This grease may not readily return to lubricate the bearing races when needed. Further this grease on the peripheries of the bearing may be washed out of the bearing during extremely wet and dry ambient operating conditions. These factors leads to either premature bearing failure or increased maintenance costs included more frequent lubrication of the bearings.

Separators may be made by any suitable process and be made of any suitable material. Typically separators are made from two pieces stamped metal, formed to conform to the rolling elements and riveted together. Alternatively separators may be machined from a metal, for example brass, or be molded from a polymer or a composite.

Brass is very expensive compared to other separator materials such as stamped metal. Material costs have risen recently and further increases are possible. Further brass separators require expensive machining to meet the dimensional tolerances and finishes need for proper operation.

Stamped metal separators require expensive tooling and equipment, much of which may be dedicated to a particular separator size. Further, the riveting of the stamped metal separators may result in missing rivets, contamination or other manufacturing issues. The stamped metal separators may not provide adequate rolling element guidance which may result in noise or other quality issues.

The present invention is directed to alleviate at least some of these problems with the prior art.

BRIEF DESCRIPTION OF THE INVENTION

According to an embodiment of the invention a bearing retainer for use in a bearing is provided. The bearing includes an inner ring, rolling elements and an outer ring. The bearing retainer includes a body. The body defines an inner periphery and an outer periphery of the body. The body further defines a plurality of inner walls. Each inner wall defines an opening extending from the inner periphery to the outer periphery of the body. The plurality of openings are adapted to receive one of the rolling elements. The inner walls are adapted to keep the rolling elements in a spaced apart relationship. At least one of the inner walls defines a aperture through the body. The aperture is adapted for storing lubrication therein.

According to another aspect of the invention, the bearing retainer may be provided wherein the body further defines an intermediate periphery extending from the inner periphery to the outer periphery.

According to another aspect of the invention, the bearing retainer may be provided wherein at least one of the inner periphery. The intermediate periphery and the external periphery define a pocket for receiving lubricant.

According to another aspect of the invention, the bearing retainer may be provided wherein the body is adapted to provide a pathway for the lubricant from the pocket, through the aperture and into one of the plurality of openings.

According to another aspect of the invention, the bearing retainer may be provided wherein the body defines a hub. A first surface of the hub defines at least a portion of the inner periphery of the body. A second surface of the hub defines at least a portion of the intermediate periphery of the body. The intermediate periphery defines the pocket.

According to another aspect of the invention, the bearing retainer may be provided wherein the at least one of the inner periphery, the intermediate periphery and the external periphery defines a second pocket for receiving lubricant, the second pocket spaced from the first pocket.

According to another aspect of the invention, the bearing retainer may be provided wherein the first mentioned pocket and the second pocket are positioned between adjacent openings.

According to another aspect of the invention, the bearing retainer may be provided wherein the hub defines opposed first and second faces of the body and wherein the first mentioned pocket and the second pocket are positioned between the first face and the openings.

According to another aspect of the invention, the bearing retainer may further include a third pocket and a fourth pocket positioned between the second face and the openings.

According to an embodiment of the invention a bearing is provided. The bearing includes an inner ring defining an inner race, an outer ring defining an outer race, a plurality of rolling elements adapted to move along the inner race and the outer race, and a bearing retainer. The bearing retainer includes a body. The body defines an inner periphery and an outer periphery of the body. The body further includes a plurality of inner walls. Each inner wall defines an opening extending from the inner periphery to the outer periphery. The plurality of openings are adapted to receive one of the rolling elements. The inner walls are adapted to keep the rolling elements in a spaced apart relationship. At least one of the inner walls defines a aperture through the body. The aperture is adapted for storing lubrication therein.

According to another aspect of the invention, the bearing may be provided wherein the body further defines an intermediate periphery, extending from the inner periphery to the outer periphery.

According to another aspect of the invention, the bearing may be provided wherein at least one of the inner periphery, the intermediate periphery and the external periphery defines a pocket for receiving lubricant.

According to another aspect of the invention, the bearing may be provided wherein the body is adapted to provide a pathway for the lubricant from the pocket, through the aperture and into one of the plurality of openings.

According to another aspect of the invention, the bearing may be provided wherein the body defines a hub. A first surface of the hub defines at least a portion of the inner periphery of the body, a second surface of the hub defining at least a portion of the intermediate periphery of the body, the intermediate periphery defining the pocket.

According to another aspect of the invention, the bearing may be provided wherein at least one of the inner periphery, the intermediate periphery and the external periphery defines a second pocket for receiving lubricant, the second pocket spaced from the first pocket.

According to another aspect of the invention, the bearing may be provided wherein the hub defines opposed first and second faces of the body and wherein the first mentioned pocket and the second pocket are positioned between the first face and the openings.

According to another aspect of the invention, the bearing may be provided wherein the body includes a first portion and a second portion connectable to the first portion and wherein the plurality of openings are adapted to retain the rolling elements in a spaced apart relationship.

According to another aspect of the invention, the bearing may be provided wherein the first portion includes a first connector and wherein the second portion includes a second connector. The first connector and the second connector are adapted to cooperate with each other to secure the first portion to the second portion.

According to another aspect of the invention, the bearing may be provided wherein the first portion includes a plurality of first type connectors and a plurality of second type connectors. The bearing may further be provided wherein the second portion includes a plurality of first type connectors and a plurality of second type connectors. At least some of the second type connectors are adapted to cooperate with at least some of the first type connectors to secure the first portion to the second portion.

According to an embodiment of the invention a method for guiding and lubricating rolling elements in a bearing is provided. The method includes the steps of providing a bearing including an inner ring, an outer ring and a plurality of rolling elements, providing a bearing retainer having a body defining an inner periphery, an intermediate periphery and an outer periphery of the body. The body further defines a plurality of spaced apart inner walls. Each of the walls defines an opening extending from the inner periphery to the outer periphery. The method includes the steps of adapting the plurality of walls to retain the rolling elements in a spaced apart relationship between the inner ring and the outer ring, forming an aperture in at least one of the inner walls, forming a pocket for storing lubrication on at least one of the inner periphery, the intermediate periphery and the outer periphery, and providing a passage from the pocket through the aperture and to the opening to provide for lubrication of the rolling elements.

DETAILED DESCRIPTION OF THE INVENTION

The method, systems and apparatus described herein facilitate the guiding of rolling elements in a bearing and the lubrication of the rolling elements in a bearing. Separators serve to separate adjacent rolling elements and to generally direct the rolling elements as they roll in the bearing races of the bearing inner ring and the bearing outer ring. Typically the separators are supported by the rolling elements and float between the inner ring and the outer ring of the bearing. Lubricants are use to provide lubrication of the bearing race surfaces and the rolling element surfaces. The lubrication of these surfaces greatly reduces friction and extends the life of the bearing. The lubrication typically is from natural or synthetic oil. The oil may be suspended in grease. The grease may move away from the path of the rolling elements during bearing use. The separator may trap a portion of the grease away from the path of the rolling elements. Improvement in the guiding of the rolling elements and in their lubrication may improve the life of the bearing.

The methods, systems, and apparatus described herein assist in improved guidance of the rolling element and in improved lubrication of the bearing contact surfaces. The methods, systems, and apparatus described herein may also facilitate assembly speed and accuracy. Furthermore, the methods, systems, and apparatus described herein provide for an improved appearance of the bearing and its appeal to the customer.

Technical effects of the methods, systems, and apparatus described herein include at least one of improved performance and quality and reduced labor costs.

According to an embodiment of the invention and referring to FIG. 1-4, a bearing retainer 10 for use in a bearing 12 is provided. The bearing 12 includes an inner ring 14, rolling elements 16 and an outer ring 18.

While, as shown, the bearing 12 is a ball bearing that utilizes rolling elements 16 in the form of spherical elements or balls, it should be appreciated that the rolling elements may be any rolling element including balls, cylindrical rollers, truncated balls, spherical rollers, and needle rollers.

The rolling elements 16, the inner ring 14 and the outer ring 18 may be made of any suitable durable material and may, for example, be made of a metal, for example, a steel alloy. If made of a metal, the metal may be heat treated, either through hardened or case hardened.

The bearing 12 may be used in a device 20 to, for example, support a rotating shaft 22. The bearing may be a portion of a bearing assembly 23. The bearing assembly 23 may include the bearing 12 and a housing 24 in which the bearing 12 may be mounted. The housing 24 may be surface mounted, as shown, and may, as shown, be a device commonly called a pillow block. The housing may alternatively be a face mounted bearing housing or be an integral housing for the device 20. The bearing assembly 23 may also include a feature 26 that may be used to lock or prevent relative motion of shaft 22 with respect to the bearing inner ring 14.

Figure 1:
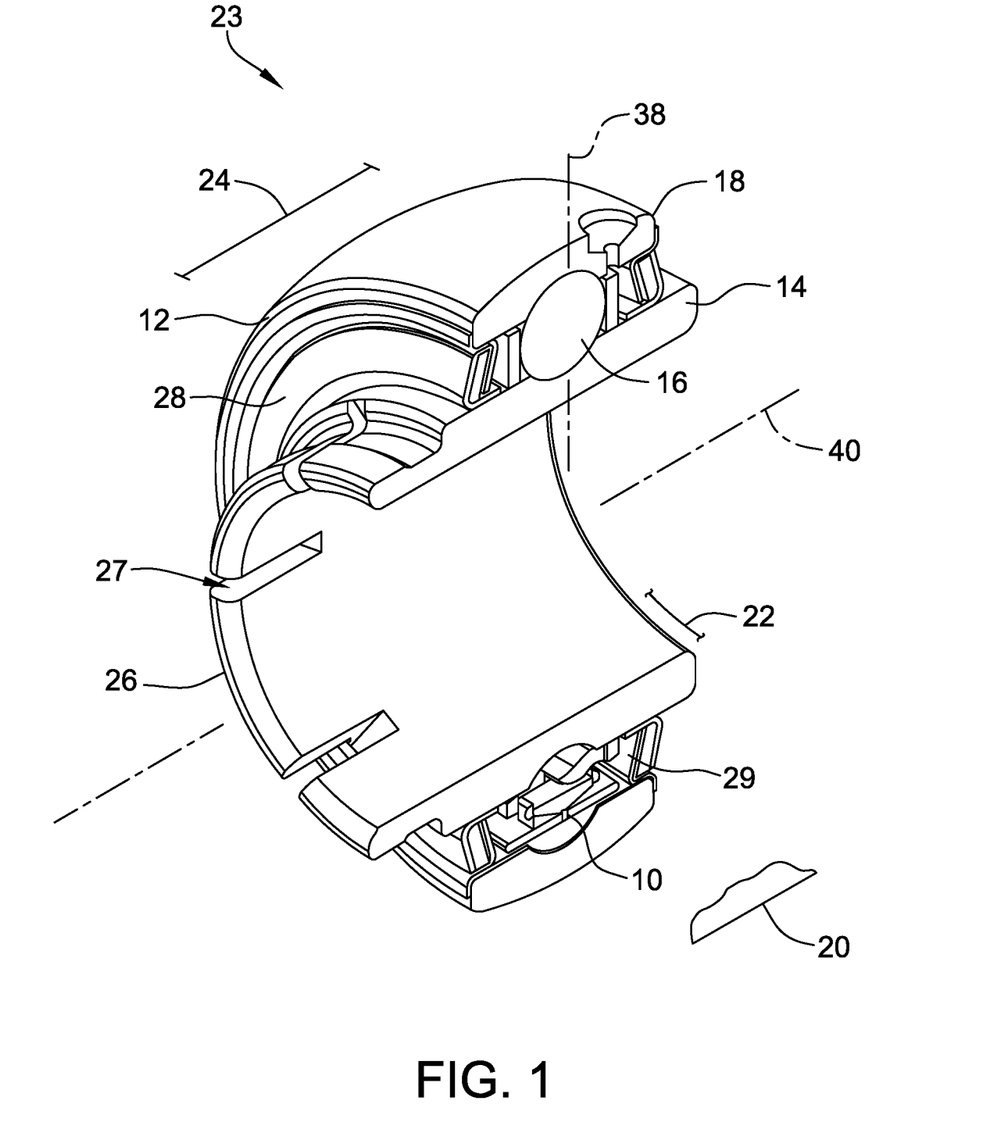
FIG. 1 is a perspective view of an embodiment of the present invention in the form of an bearing assembly.
Figure 2:
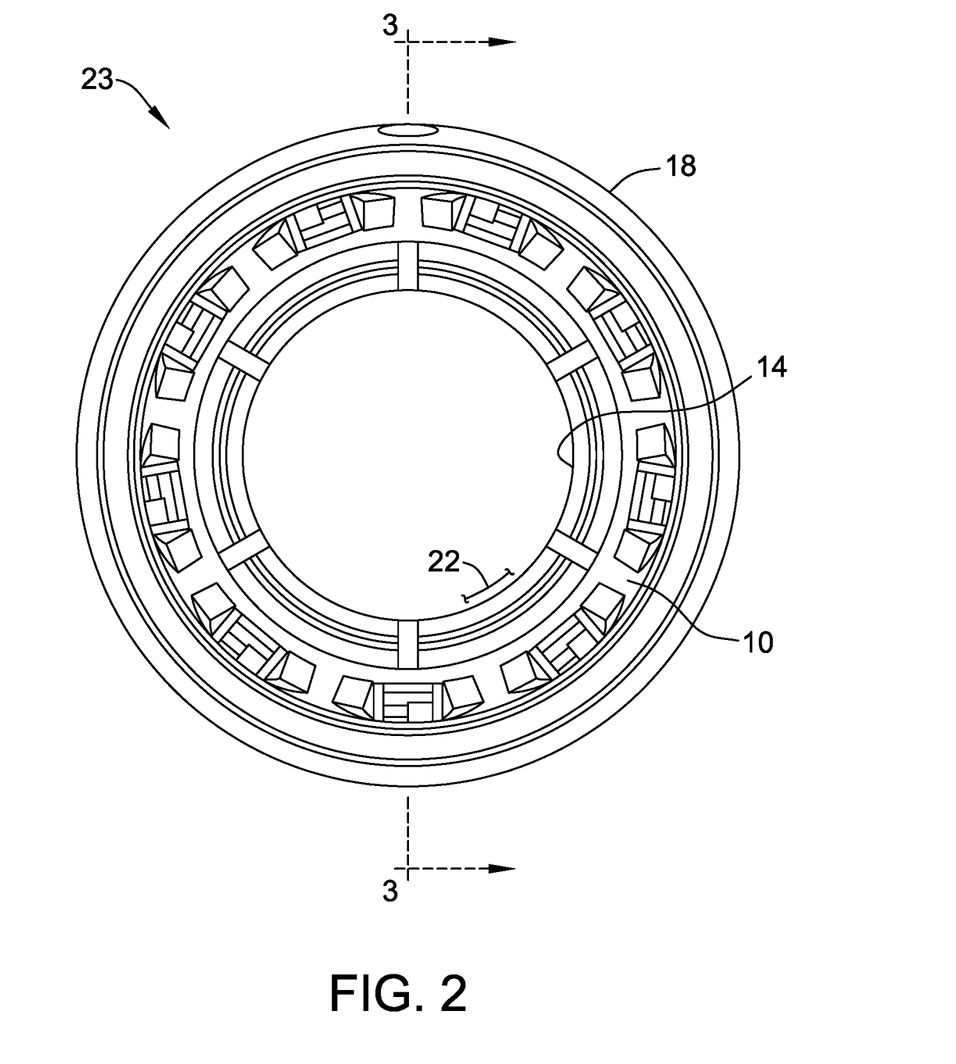
FIG. 2 is a plan view of the bearing assembly of FIG. 1.

The feature 26 may, as shown, be in the form of collar 26. The collar 26 may be provided to collapse around the shaft 22 as shown. As shown in FIG. 1, the inner ring 14 may include axially extending slits 27 that assist in enabling the collapsing of the inner ring 14. Alternatively or in addition the collar may include a set screw (not shown) or eccentric ring (not shown) to provide the locking of the shaft 22 to the inner ring 14.

Further, the bearing assembly 23 may also include seals 28 that may be positioned between the inner ring 14 and the outer ring 18 to prevent contamination to egress into the rolling elements 16 and to contain lubrication 29 within the bearing 12.

Figure 5:
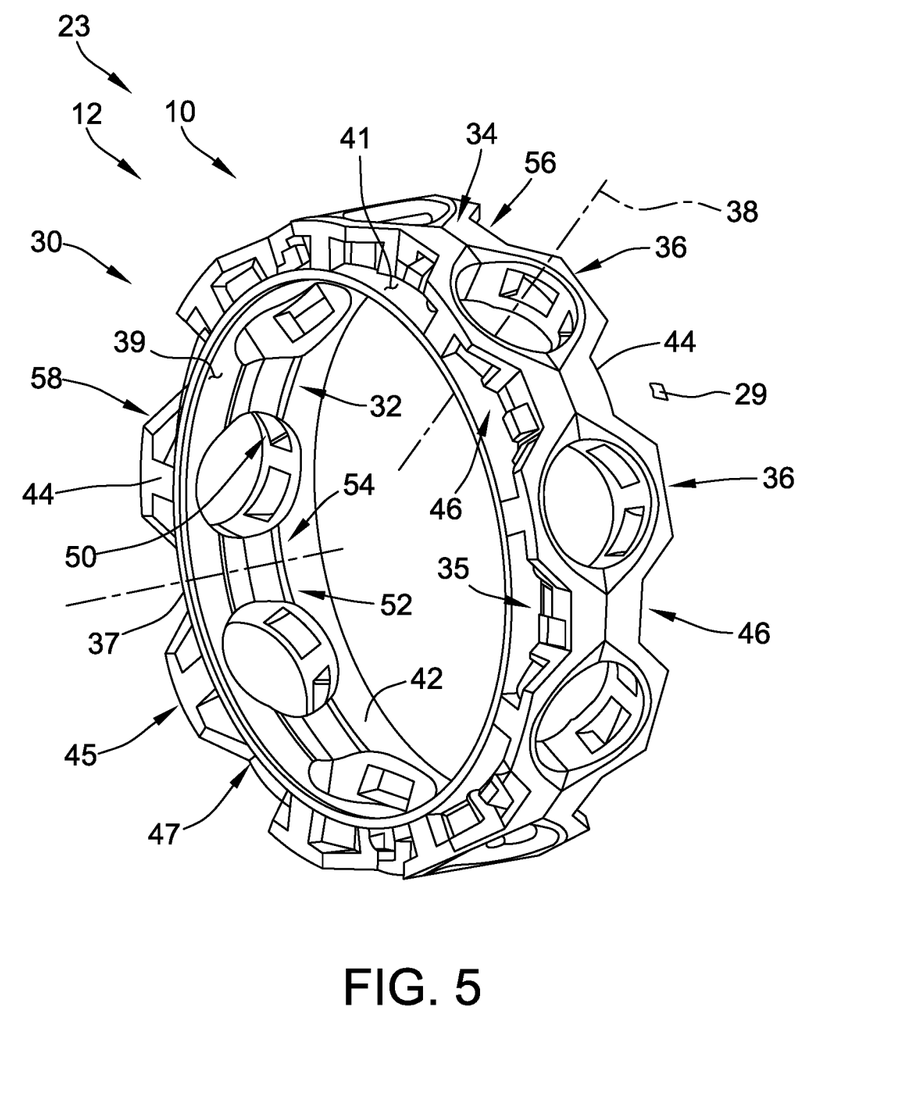
FIG. 5 is a perspective view of a retainer for use in the bearing assembly of FIG. 1.
Figure 6:
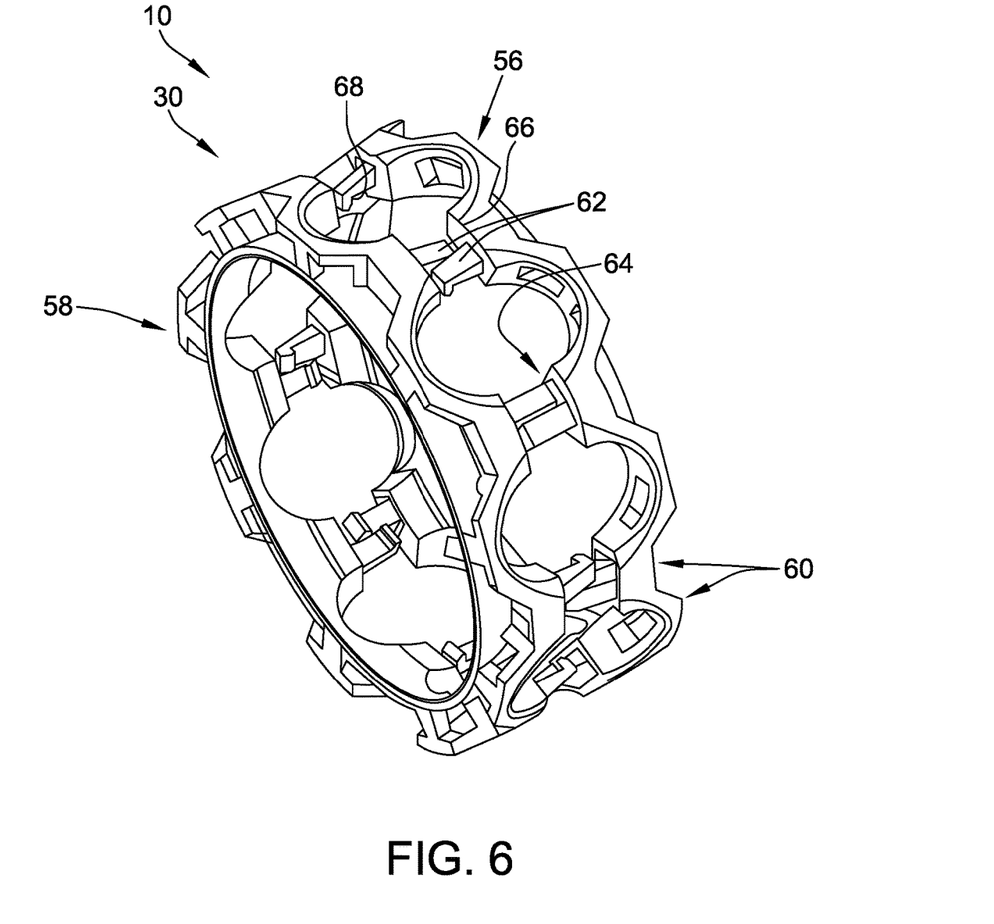
FIG. 6 is a perspective view of the retainer of FIG. 5, showing the two identical retainer portions that may be used to make the retainer of FIG. 5.

Referring now to FIGS. 5 and 6, the bearing retainer 10 includes a body 30. The body 30 of the retainer 10 defines an inner periphery 32 and an outer periphery 34 of the body 30. The body 30 further defines a plurality of openings 36 extending from the inner periphery 32 to the outer periphery 34. The plurality of openings 36 are adapted to retain the rolling elements 16 in a spaced apart relationship. The body 30 further defines an intermediate periphery 35, extending from the inner periphery 32 to the outer periphery 34. The body 30 also defines a hub 37, a first surface 39 of the hub 37 defines at least a portion of the inner periphery 32 of the body 30. A second surface 41 of the hub 37 defines at least a portion of the intermediate periphery 37 of the body 30. The intermediate periphery 37 may define the face-outer periphery pocket 46.

The openings 36 may have any suitable shape. Preferably the openings 36 has a shape that conforms to the shape of the rolling elements 16 at their contact points/areas with the rolling elements 16. If the rolling elements 16 are balls or spheres, as shown in FIGS. 1-4, the openings 36 may be cylindrical or spherical shaped. A cylindrical shape provides for minimal contact with the elements 16 and minimal wear to the retainer. It should be appreciated that the cylindrical shape may be such that the openings define a cylindrical shape with an opening centerline 38 and a radius R extending from the opening centerline 38. The opening centerline 38 may extend, as shown, radially outwardly from bearing centerline 40.

As shown in FIG. 5, the inner periphery 32 of the retainer 10 defines a portion 42 of the periphery 32 that is adapted to closely conform with the inner ring 14 of the bearing 12.

The body 30 may be made of any suitable durable material. To provide for a durable retainer 10 that has inexpensive materials and that can be make with an inexpensive process, such as molding, the body may be made of a polymer. Alternatively the body may be made of a composite material, including a polymer.

Referring now to FIGS. 5 and 6, the body 30 further defines opposed faces 44. While the faces 44 extend from the inner periphery 32 to the outer periphery 34 of the body 30, only inner portion 45 of the faces 44 and a small portion of outer portion 47 of the faces are planar. Most of the outer portion 47 of the faces 44 is contoured and is in a spaced apart relationship to the opening 36.

The body 30 may define areas or pockets for storing lubrication 29. For example and as shown in FIG. 5, the body 30 may further define a plurality of face-outer periphery pockets 46 formed in one of at least one of the faces 44 and the outer periphery 34 of the body 30. The face-outer periphery pockets 46 are adapted for storing lubrication 29. Typically the lubrication 29 is in the form of a grease.

Figure 3:
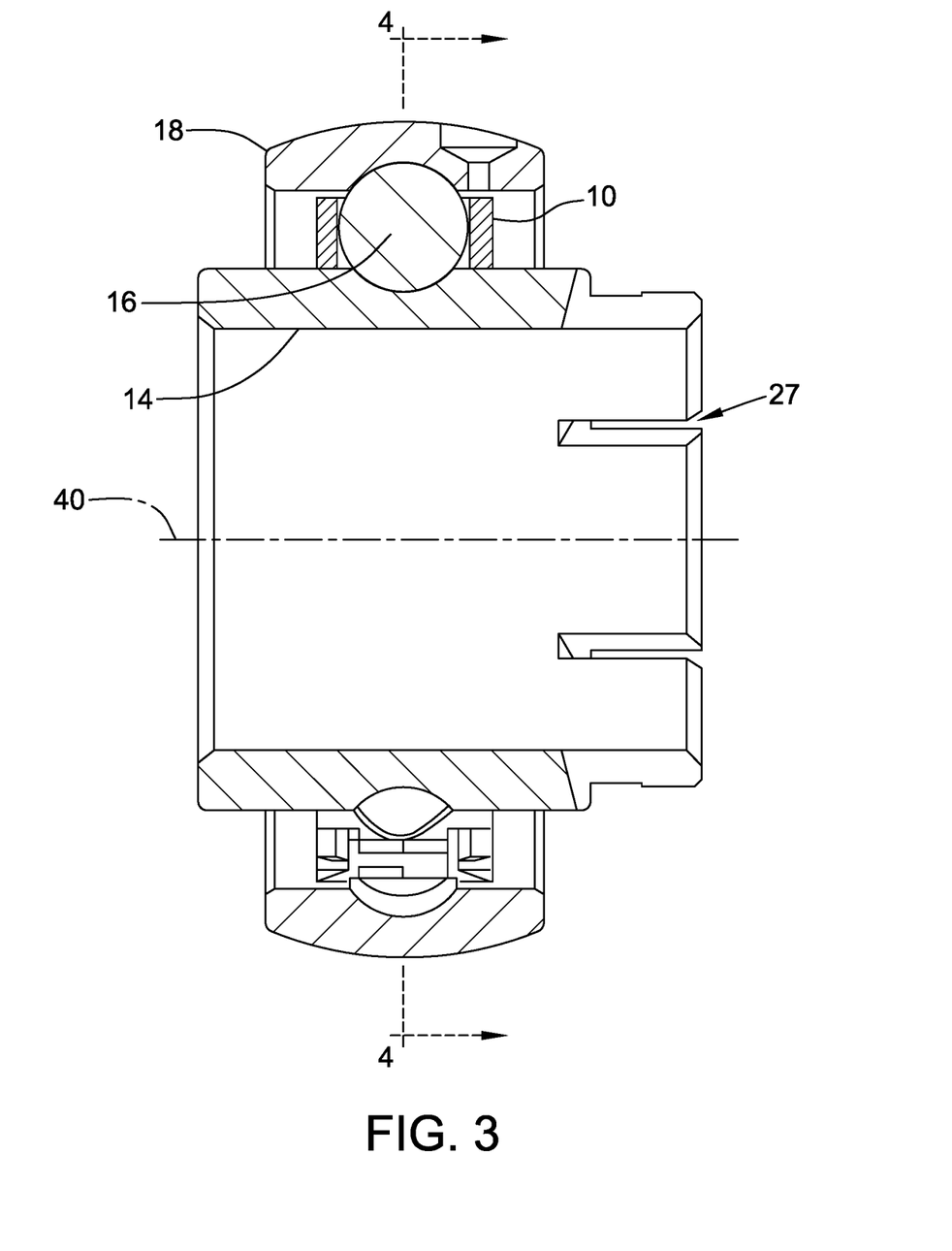
FIG. 3 is a cross sectional view of the bearing assembly of FIG. 2 along the line 3-3 in the direction of the arrows.
Figure 4:
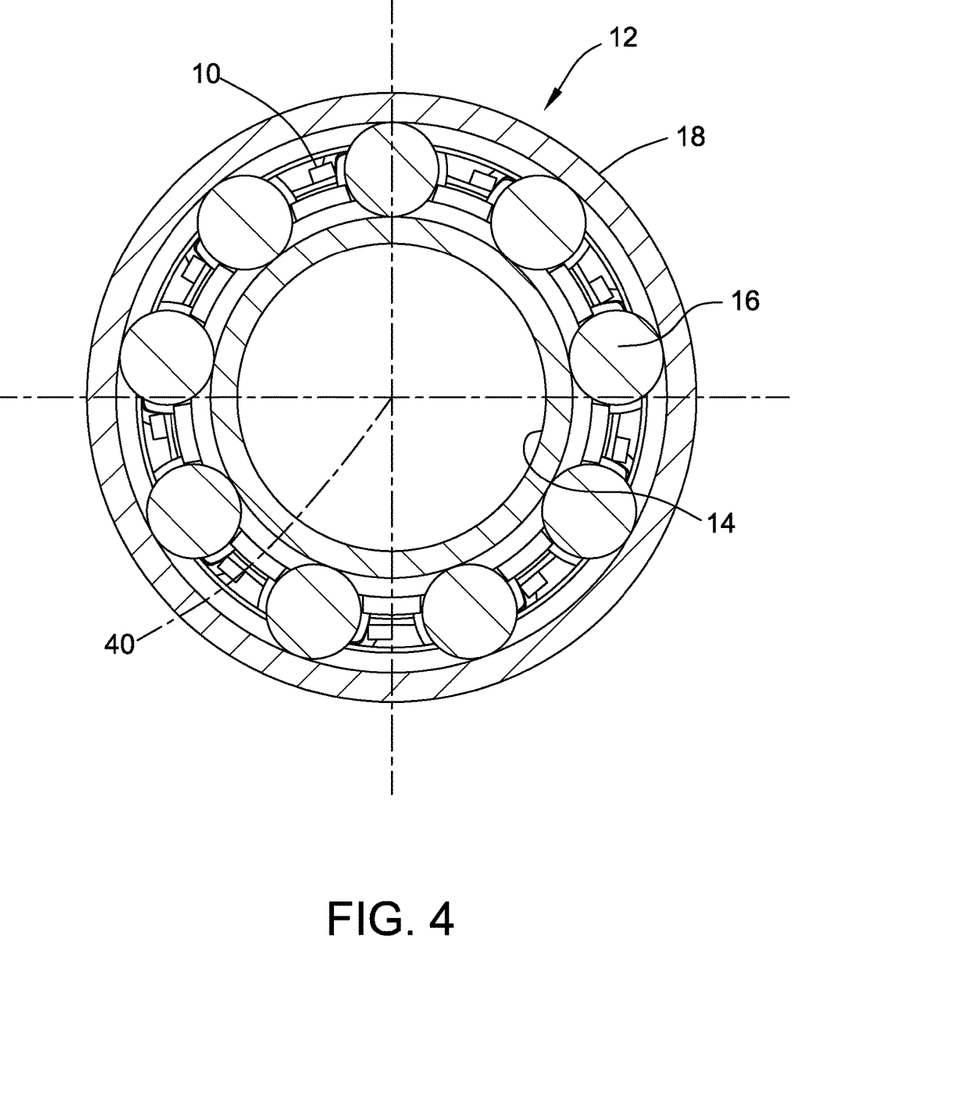
FIG. 4 is a cross sectional view of the bearing assembly of FIG. 3 along the line 4-4 in the direction of the arrows.

The lubrication 29 is utilized to provide lubrication to the rolling elements 16 and to bearing race 48 of the inner ring 14 and to bearing race 49 of the outer ring 18 (see FIGS. 3 and 4).

Preferably and as shown in FIGS. 5 and 6, the body 30 defines pathways 50 for passage of the lubrication 29 from the face-outer periphery pockets 46 to the rolling elements and the races. The pathways 50 may be direct, as shown, or indirect.

The face-outer periphery pockets 46 may be configured to provide storage for lubrication 29 and pathways 50 for lubrication 29 such that all the rolling elements may be individually lubricated. For simplicity and to optimally lubricate each rolling element, the body 30 may define two face-outer periphery pockets 46 for each rolling element 16, on formed on each of the opposed faces 44. The face-outer periphery pockets 46, as is shown, may be positioned between adjacent openings 36 on both sides of the bearing and formed in both faces 44.

In addition to or instead of the face-outer periphery pockets 46, inner periphery pockets 52 may be formed in inner periphery 32 of the body 30. As shown in FIGS. 5 and 6, the body 30 may include both face-outer periphery pockets 46 and inner periphery pockets 52.

Preferably and as shown in FIGS. 5 and 6, the body 30 defines inner periphery pocket pathways 54 for passage of the lubrication 29 from the inner periphery pockets 52 to the rolling elements and the races. The pathways 54 may be indirect or, as shown, direct. As shown and for simplicity, the inner periphery pockets 52 and the inner periphery pocket pathways 54 are the same and are in the form of circumferential groove portions, each portion 54 positioned between adjacent openings 36.

The Pockets 54 may be configured to provide storage for lubrication 29 and pathways 54 for lubrication 29 such that all the rolling elements 16 may be individually lubricated. For simplicity and to optimally lubricate each rolling element 16, the body 30 may define a pockets 52 for each rolling element 16. The pockets 52, as are shown, may be positioned between adjacent openings 36.

As shown in FIGS. 5 and 6, lubrication from the face-outer periphery pockets 46 may pass to the inner periphery pockets 52 by pathways 50 between the face-outer periphery pockets 46 and the inner periphery pockets 52.

The body 30 may be made of a unitary construction or may be made from a plurality components which are assembled together to form the body. As shown in FIGS. 5 and 6 and according to an aspect of the invention, the bearing retainer 10 may be provided wherein the body 30 includes a first portion or component 56 and a second portion or component 58 connectable to the first portion 56.

Using a plurality of components makes the molding of the complex features of the body 30 easier and less expensive. Further, the use of a plurality of components makes the assembly of the bearing easier and permits the insertion of the retainer 10 after the rolling elements 16 have been assembled to the rings 14 and 18.

While the first portion 56 and the second portion 58 may be different, for simplicity and to reduce manufacturing and tooling costs, the first portion 56 and the second portion 58 may, as shown in FIGS. 5 and 6, be substantially identical.

The first portion 56 and the second portion 58 may be connected to each other in any suitable manner. For example the first portion 56 and the second portion 58 may be connected by interference fit, by adhesives or, as shown, by connectors 60 that secure the portions 56 and 58 together.

As shown in FIGS. 5 and 6, the connectors 60 may be in the form of pairs of connectors 60. The pair of connectors 60 may include a first connector 62 in the first portion 56 which engages a second connector 64 in the second portion 58.

For example and as shown in FIGS. 5 and 6, the first connector may be in the form of a protrusion 62 extending from one of the first portion 56 and the second connector may be in the form of an aperture or opening 64 defined by a ledge 66 in the body 30 extending from the second portion 58. The protrusion 62 may have a lip 68 that engages the ledge 66 to lock the portions 56 and 58 together.

The protrusion 62 is preferably resilient such that the protrusion is in an after assembly relaxed position in which the lip 68 engages the ledge 66 and a during assembly deflected position (not shown) in which the lip 68 is deflected so that it passes through the opening 64 before it is released into its relaxed position in engagement with the ledge 66.

For bearings 12 with an even number of rolling elements 16 and an even number of openings 36, a protrusion 62 and an opening 64 can be alternately positioned around a face 44 of the portions 56 and 58 so that an opening in the face 44 of first portion 56 engages a protrusion 62 in the face 44 of second portion 58 and vice versa.

For bearings with an odd number of rolling elements 16 and an odd number of openings 36, as shown in FIGS. 5 and 6, this alternating positioning for protrusions and openings cannot be utilize in identical portions to lock the portions 56 and 58 together. For bearings with an odd number of rolling elements 16, referring to FIGS. 5 and 6 and according to another aspect of the invention, the bearing retainer may be provided wherein the first portion 56 includes pairs including one first type connector 62 and one second type connector 64 and wherein the second portion 58 also includes pairs of one first type connector 62 and one second type connector 64. At least one pair of connectors 62 and 64 on the first portion 56 is adapted to cooperate with at least one pair of connectors 62 and 64 on the second portion 58 to secure the first portion 56 to the second portion 58.

As shown in FIGS. 5 and 6, one pair of connectors 60 including one first type connector 62 and one second type connector 64 may be positioned between adjacent openings 36 along one face 44 of the first portion 56. Similarly, one pair of connectors 60 including one first type connector 62 and one second type connector 64 is positioned between adjacent openings 36 along one face 44 of the second portion 58. Note that utilizing this arrangement, the first portion 56 may be identical with the second portion 58 and that the respective pairs of first type connector 62 and second type connector 64 of the first portion and the second portion align with each other when the faces 44 of the portions 56 and 58 are brought together for assembly to each other.

Figure 7:
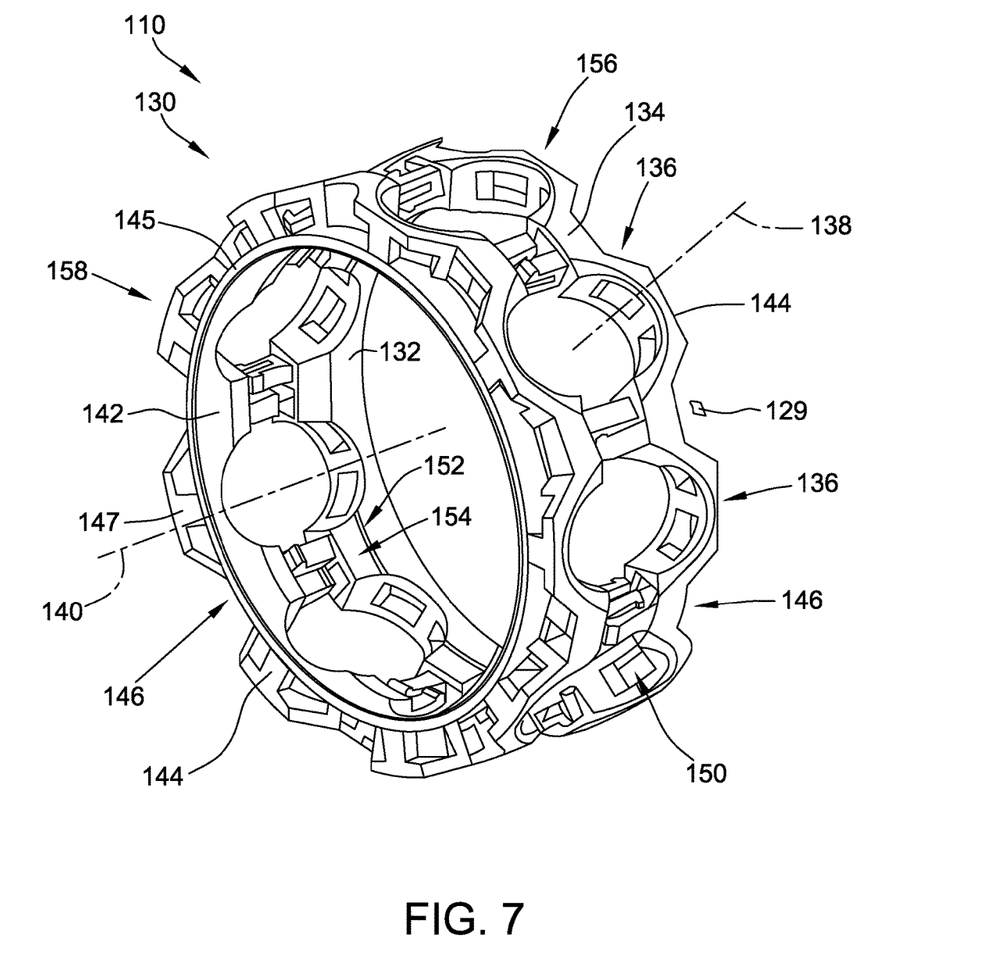
FIG. 7 is a perspective view of another retainer for use in the bearing assembly of FIG. 1, showing the two identical retainer portions that may be used to make the retainer of FIG. 7, the portions using pairs of closely spaced protrusions to connect the portions.
Figure 8:
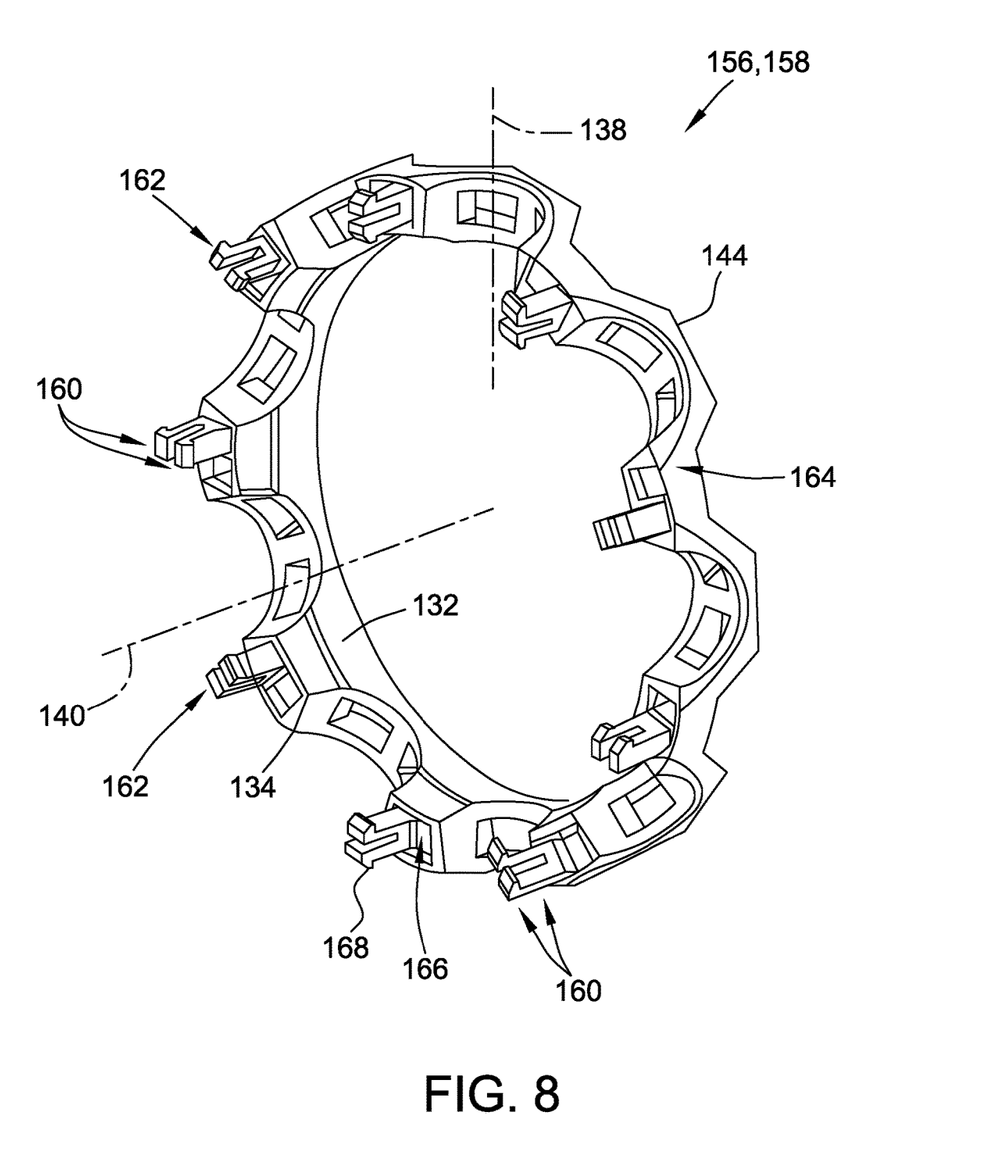
FIG. 8 is a perspective view of one of the retainer portions that may be used with an identical retainer portion to make the retainer of FIG. 7.

As shown in FIGS. 7 and 8, another embodiment of the present invention is shown as bearing retainer 110. The bearing retainer may be used in a bearing (not shown) similar or identical to bearing 12 of FIGS. 1-4 or any bearing described in the description of bearing 12 and may be assembled into a bearing assembly similar or identical to the bearing assembly 23 of FIGS. 1-2 or any assembly described in the description of bearing assembly 23

Referring now to FIGS. 7 and 8, the bearing retainer 110 includes a body 130. The body 130 may be made of any suitable durable material. To provide for a durable retainer 110 that has inexpensive materials and that can be make with an inexpensive process, such as molding, the body may be made of a polymer. Alternatively the body may be made of a composite material, including a polymer.

The body 130 of the retainer 110 defines an inner periphery 132 and an outer periphery 134 of the body 130. The body 130 further defines a plurality of opening 136 extending from the inner periphery 132 to the outer periphery 134 of the body 130. The plurality of openings 136 are adapted to retain the rolling elements (not shown) in a spaced apart relationship.

The openings 136 may have any suitable shape. Preferably the openings 136 has a shape that conforms to the shape of the rolling elements at their contact points/areas with the rolling elements. If the rolling elements are balls or spheres, as shown in FIGS. 5-6, the openings 136 may be cylindrical or spherical shaped. A cylindrical shape provides for minimal contact with the elements 116 and minimal wear to the retainer. It should be appreciated that the cylindrical shape may be such that the openings define a cylindrical shape with an opening centerline 138 and a radius RR extending from the opening centerline 138. The opening centerline 138 may extend, as shown, radially outwardly from bearing centerline 140.

As shown in FIGS. 7 and 8, the inner periphery 132 of the retainer 110 defines a portion 142 of the periphery 132 that is adapted to closely conform with the inner ring of the bearing.

Referring now to FIG. 7, the body 130 further defines opposed faces 144. While the faces 144 extend from the inner periphery 132 to the outer periphery 134 of the body 130, only inner portion 145 of the faces 144 and a small portion of outer portion 147 of the faces are planar. Most of the outer portion 147 of the faces 144 is contoured and is in a spaced apart relationship to the opening 136.

The body 130 may define areas or pockets for storing lubrication 129. For example and as shown in FIG. 3, the body 130 may further define a plurality of face-outer periphery pockets 146 formed in one of at least one of the faces 144 and the outer periphery 134 of the body 130. The face-outer periphery pockets 146 are adapted for storing lubrication 129. Typically the lubrication 129 is in the form of a grease.

Preferably and as shown in FIGS. 7 and 8, the body 130 defines pathways 150 for passage of the lubrication 129 from the face-outer periphery pockets 146 to the openings 136. The pathways 150 may be direct, as shown, or indirect.

In addition to or instead of the face-outer periphery pockets 146, inner periphery pockets 152 may be formed in inner periphery 132 of the body 130. As shown in FIGS. 7 and 8, the body 130 may include both face-outer periphery pockets 146 and inner periphery pockets 152.

Preferably and as shown in FIGS. 7 and 8, the body 130 defines inner periphery pocket pathways 154 for passage of the lubrication 129 from the inner periphery pockets 152 to the rolling elements and the races. The pathways 154 may be indirect or, as shown, direct. As shown and for simplicity, the inner periphery pockets 152 and the inner periphery pocket pathways 154 are the same and are in the form of circumferential groove portions, each portion 154 positioned between adjacent openings 136.

Pockets 152 may be configured to provide storage for lubrication 129 and pathways 154 for lubrication 129 such that all the rolling elements 116 may be individually lubricated. For simplicity and to optimally lubricate each rolling element 116, the body 130 may define the pockets 152 for each rolling element 116. The pockets 152, as are shown, may be positioned between adjacent openings 136.

As shown in FIGS. 7 and 8, lubrication from the face-outer periphery pockets 146 may pass to the inner periphery pockets 152 by pathways 150 between the face-outer periphery pockets 146 and the inner periphery pockets 152.

The body 130 may be made of a unitary construction or may be made from a plurality components which are assembled together to form the body. As shown in FIGS. 7 and 8 and according to an aspect of the invention, the bearing retainer 110 may be provided wherein the body 130 includes a first portion or component 156 and a second portion or component 158 connectable to the first portion 156.

The first portion 156 and the second portion 158 may be connected to each other in any suitable manner. For example the first portion 156 and the second portion 158 may be connected by interference fit, by adhesives or, as shown, by connectors 160 that secure the portions 156 and 158 together.

As shown in FIGS. 7 and 8, the connectors 160 may be in the form of pairs of connectors 160. The connectors 160 are similar to the connectors 60 of FIGS. 1-6. The pair of connectors 160 may include a first connector 162 in the first portion 156 which engages a second connector 164 in the second portion 158, or vise versa.

For example and as shown in FIGS. 7 and 8, the first connector 162 may be in the form of a pair of two spaced apart protrusions 162 extending from one of the first portion 156 and the second portion 158. The second connector may be in the form of an aperture or opening 164 defined by a ledge 166 in the body 130 extending from the other of the first portion 156 and the second portion 158. The two spaced apart protrusions 162 may each have a lip 168 extending transversely and outwardly in opposed directions such that each lip 168 engages opposed portions of the ledge 166 to lock the portions 156 and 158 together.

The protrusions 162 are preferably resilient such that the protrusions 162 are in after assembly relaxed positions in which the lips 168 engages the opposed portions of the ledges 166 and are in during assembly deflected positions (not shown) in which the lips 168 are deflected so that they pass through the opening 164 before they are released into their relaxed position in engagement with opposed portions of the ledges 166.

Figure 9:
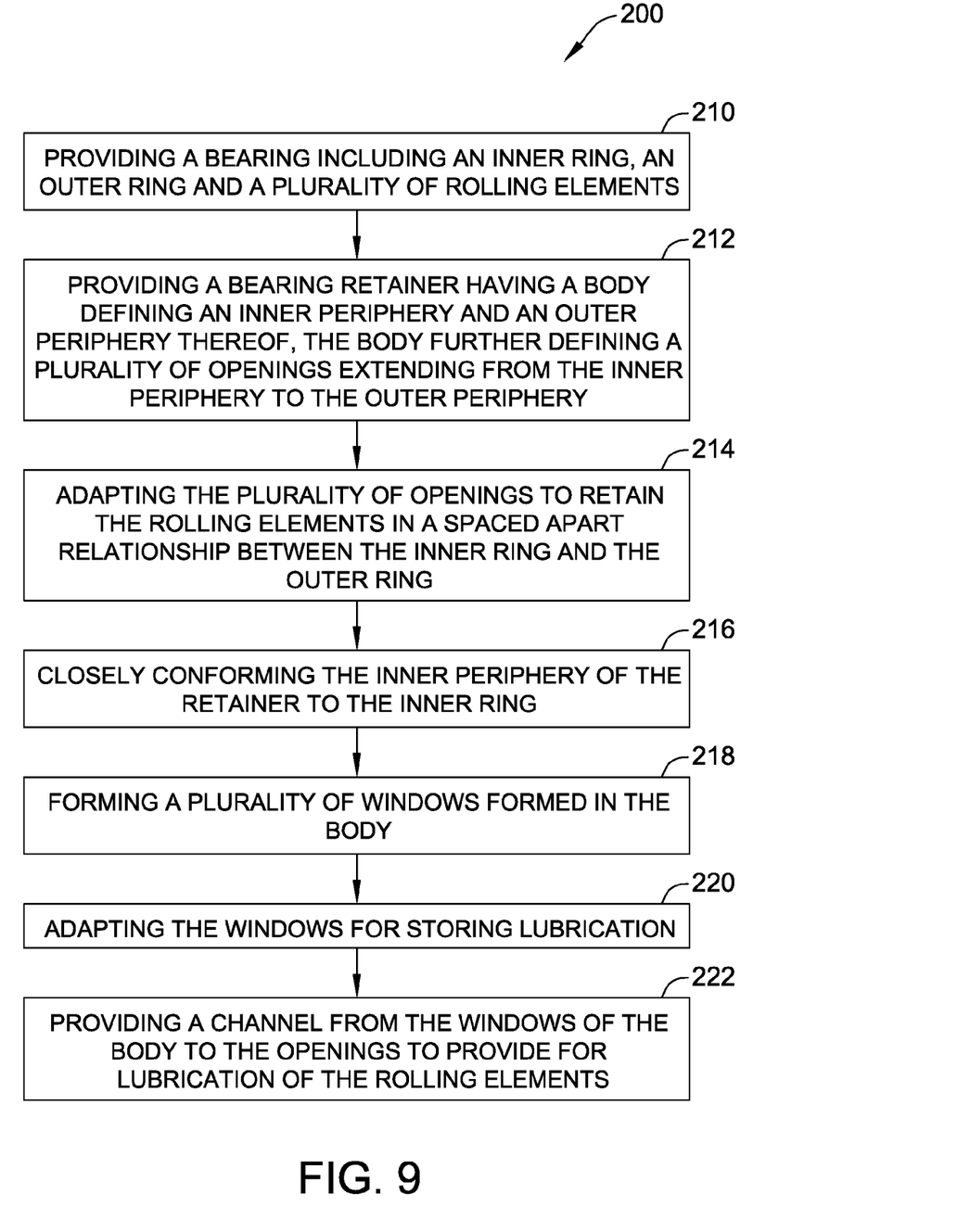
FIG. 9 is a schematic flow chart of a method for using the bearing retainer of the present invention.

According to another embodiment of the invention and referring to FIG. 9, a method 200 for guiding and lubricating rolling elements in a bearing is provided. The method includes the step 210 of providing a bearing including an inner ring, an outer ring and a plurality of rolling elements and step 212 of providing a bearing retainer having a body defining an inner periphery and an outer periphery of the body. The body further defines a plurality of opening extending from the inner periphery to the outer periphery of the body. The method also includes the step 214 of adapting the plurality of openings to retain the rolling elements in a spaced apart relationship between the inner ring and the outer ring, step 216 of closely conforming the inner periphery of the retainer to the inner ring, step 218 of forming a plurality of pockets formed in at least one of the faces of the body, step 220 of adapting the pockets for storing lubrication, and step 222 of providing a passage, for example a channel, from the pocket in the face to the openings to provide for lubrication of the rolling elements.

The methods, systems, and apparatus described herein facilitate efficient and economical assembly of a bearing assembly. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing bearing retainers that reduce costs, enhance rolling element guidance, or improve lubrication. Furthermore, the exemplary methods system and apparatus achieve improved bearing life while reducing bearing wear and noise. The methods, system and apparatus described herein may be used in any suitable application.

Exemplary embodiments of the bearings, bearing assemblies and the bearing retainers are described above in detail. The bearing assemblies and bearing retainers are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

What is claimed is:

1. A bearing retainer for use in a bearing including an inner ring, rolling elements, lubricant and an outer ring, the bearing retainer comprising a body, said body defining an inner periphery and an outer periphery thereof, said body further defining a plurality of inner walls, each inner wall defining an opening extending from the inner periphery to the outer periphery, the plurality of openings adapted to receive one of the rolling elements, the inner walls adapted to keep the rolling elements in a spaced apart relationship, at least one of the inner walls defining an aperture therethrough, the aperture for storing the lubricant therein, wherein said body further defines an intermediate periphery, extending from the inner periphery to the outer periphery, wherein at least one of the inner periphery, the intermediate periphery and the external periphery defines a first pocket for receiving the lubricant, wherein at least one of the inner periphery, the intermediate periphery and the external periphery defines a second pocket for receiving the lubricant, the second pocket spaced from the first pocket, wherein the first pocket and the second pocket are positioned between adjacent openings.

2. The bearing retainer in accordance with claim 1:
   wherein the intermediate periphery defines the first pocket; and
   wherein the inner periphery defines the second pocket.

3. The bearing retainer in accordance with claim 2:
   wherein the intermediate periphery defines a third pocket; and
   wherein the inner periphery defines a fourth pocket.

4. The bearing retainer in accordance with claim 3:
   wherein the intermediate periphery defines additional intermediate pockets, the first pocket, the third pocket and the additional intermediate pockets having a one to one relationship with the openings; and
   wherein the inner periphery defines additional inner pockets, the second pocket, the fourth pocket and the additional inner pockets having a one to one relationship with the openings.

5. The bearing retainer in accordance with claim 1:
   wherein the intermediate periphery defines the first pocket; and
   wherein the intermediate periphery defines the second pocket.

6. The bearing retainer in accordance with claim 5, wherein the intermediate periphery defines additional intermediate pockets, the first pocket, the second pocket and the additional intermediate pockets having a one to one relationship with the openings.

7. The bearing retainer in accordance with claim 5, wherein the first pocket and the second pocket are positioned between a first of the openings.

8. The bearing retainer in accordance with claim 7, wherein the intermediate periphery defines additional intermediate pockets, the additional intermediate pockets having a two to one relationship with the space between the other of the openings.

9. The bearing retainer in accordance with claim 7:
   wherein the inner periphery defines the first pocket; and
   wherein the inner periphery defines the second pocket.

10. The bearing retainer in accordance with claim 9, wherein the inner periphery defines additional inner pockets, the first pocket, the second pocket and the additional inner pockets having a one to one relationship with the openings.

11. The bearing retainer in accordance with claim 10, wherein the additional inner pockets, the first pocket, and the second pocket each define a portion of an internal circumferential groove.

12. A bearing retainer for use in a bearing including an inner ring, rolling elements, lubricant and an outer ring, the bearing retainer comprising a body, said body defining an inner periphery and an outer periphery thereof, said body further defining a plurality of inner walls, each inner wall defining an opening extending from the inner periphery to the outer periphery, the plurality of openings adapted to receive one of the rolling elements, the inner walls adapted to keep the rolling elements in a spaced apart relationship, at least one of the inner walls defining an aperture therethrough, the aperture for storing the lubricant therein, wherein said body further defines an intermediate periphery, extending from the inner periphery to the outer periphery, wherein at least one of the inner periphery, the intermediate periphery and the external periphery defines a first pocket for receiving the lubricant, wherein at least one of the inner periphery, the intermediate periphery and the external periphery defines a second pocket for receiving the lubricant, the second pocket spaced from the first pocket, wherein the hub defines opposed first and second faces of said body; and wherein the first pocket and the second pocket are positioned between the first face and the openings.

13. The bearing retainer in accordance with claim 12, further comprising a third pocket and a fourth pocket positioned between the second face and the openings.

* * * * *